(12) United States Patent  
Silverbrook et al.

(10) Patent No.: US 7,237,874 B2
(45) Date of Patent: Jul. 3, 2007

(54) INKJET PRINTHEAD WITH GROUPED NOZZLES AND A NOZZLE GUARD

(75) Inventors: Kia Silverbrook, Balmain (AU); Tobin Allen King, Balmain (AU); Garry Raymond Jackson, Balmain (AU)

(73) Assignee: Silverbrook Research Pty Ltd, Balmain, NSW (AU)

( * ) Notice: Subject to any disclaimer, the term of this patent is extended or adjusted under 35 U.S.C. 154(b) by 0 days.

(21) Appl. No.: 11/450,584

(22) Filed: Jun. 12, 2006

(65) Prior Publication Data

US 2006/0227171 A1    Oct. 12, 2006

Related U.S. Application Data

(63) Continuation of application No. 11/082,939, filed on Mar. 18, 2005, now Pat. No. 7,066,588, which is a continuation of application No. 10/303,351, filed on Nov. 23, 2002, now Pat. No. 6,871,937, which is a continuation of application No. 09/608,779, filed on Jun. 30, 2000, now Pat. No. 6,676,250.

(51) Int. Cl.  
*B41J 2/05* (2006.01)

(52) U.S. Cl. ....................................................... 347/66

(58) Field of Classification Search ................ 347/22, 347/29, 40, 44, 64, 65, 66  
See application file for complete search history.

(56) References Cited

U.S. PATENT DOCUMENTS

| | | | |
|---|---|---|---|
| 4,417,259 A * | 11/1983 | Maeda | 347/31 |
| 4,736,212 A * | 4/1988 | Oda et al. | 347/55 |
| 4,774,530 A | 9/1988 | Hawkins | |
| 5,126,768 A | 6/1992 | Nozawa et al. | |
| 5,479,197 A | 12/1995 | Fujikawa et al. | |
| 5,485,187 A | 1/1996 | Okamura et al. | |
| 5,666,140 A | 9/1997 | Mitani et al. | |
| 5,790,151 A | 8/1998 | Mills | |
| 5,905,517 A | 5/1999 | Silverbrook | |
| 5,909,230 A | 6/1999 | Choi et al. | |
| 5,929,877 A * | 7/1999 | Hetzer et al. | 347/28 |
| 6,010,254 A | 1/2000 | Sanada et al. | |
| 6,022,099 A | 2/2000 | Chwalek et al. | |
| 6,027,205 A | 2/2000 | Herbert | |
| 6,106,089 A | 8/2000 | Wen et al. | |
| 6,132,028 A | 10/2000 | Su et al. | |
| 6,149,256 A | 11/2000 | McIntyre et al. | |
| 6,161,917 A | 12/2000 | Igarashi et al. | |
| 6,180,427 B1 | 1/2001 | Silverbrook | |

(Continued)

FOREIGN PATENT DOCUMENTS

EP    0498292 A    8/1992

(Continued)

*Primary Examiner*—Anh T. N. Vo

(57) ABSTRACT

A printhead for inkjet printing includes a substrate. A plurality of nozzles is arranged on the substrate in groups. The substrate defines groups of ink supply passages to supply an ink of a particular color to respective nozzles of each group. A nozzle guard is arranged with respect to the nozzles to define a space between the nozzle guard and the nozzles. The nozzle guard defines a plurality of passages with each passage being in register with a respective nozzle so that each nozzle can eject the ink across the space and through a respective passage.

4 Claims, 11 Drawing Sheets

U.S. PATENT DOCUMENTS

| | | |
|---|---|---|
| 6,196,668 B1 | 3/2001 | Bode |
| 6,231,173 B1 | 5/2001 | Pawlowski et al. |
| 6,239,821 B1 | 5/2001 | Silverbrook |
| 6,250,738 B1 | 6/2001 | Waller et al. |
| 6,260,953 B1 | 7/2001 | Silverbrook |
| 6,273,544 B1 | 8/2001 | Silverbrook |
| 6,281,912 B1 | 8/2001 | Silverbrook |
| 6,294,420 B1 | 9/2001 | Tsu et al. |
| 6,347,864 B1 | 2/2002 | Silverbrook et al. |
| 6,588,952 B1 | 7/2003 | Silverbrook et al. |
| 6,929,350 B2 | 8/2005 | Silverbrook |

FOREIGN PATENT DOCUMENTS

| | | | |
|---|---|---|---|
| EP | 0539804 | A | 5/1993 |
| EP | 0764977 | A | 3/1997 |
| EP | 0812689 | A1 | 12/1997 |
| EP | 0829360 | A2 | 3/1998 |
| EP | 0865922 | A | 9/1998 |
| EP | 0867294 | A2 | 9/1998 |
| GB | 2086807 | A | 5/1982 |
| GB | 2333065 | A | 7/1999 |
| JP | 402030543 | A | 1/1990 |
| JP | 10151743 | A | 6/1998 |
| JP | 11245414 | A | 9/1999 |
| WO | WO 96/32808 | | 10/1996 |

\* cited by examiner

INKJET PRINTHEAD WITH GROUPED NOZZLES AND A NOZZLE GUARD

CROSS REFERENCE TO RELATED APPLICATION

The present application is a continuation of U.S. application Ser. No. 11/082,939 filed on Mar. 18, 2005 now U.S. Pat. No. 7,066,588, which is a continuation of U.S. application Ser. No. 10/303,351 filed on Nov. 23, 2002, now issued U.S. Pat. No. 6,871,937, which is a continuation U.S. application Ser. No. 09/608,779 filed on Jun. 30, 2000, now issued U.S. Pat. No. 6,676,250 the entire contents of which are herein incorporated by reference.

FIELD OF THE INVENTION

This invention relates to a print engine. The invention has particular application in a print engine for use in an instantaneous print, digital camera. More particularly, the invention relates to an ink supply assembly for supplying ink to a printhead of the print engine.

BACKGROUND TO THE INVENTION

It will be appreciated that a printhead of the printer engine of a page width printer has a width dimension measured in fractions of millimeters. Typically the printhead has a width dimension of about six hundred micrometers. In an array of ink jet nozzles, adjacent nozzles could be spaced from each other by dimensions in the order of 100 micrometers. While the substrate of the printhead is made from a silicon wafer a supply mechanism for supplying ink to the substrate is often made out of plastic. To mold the plastic such that individual ink supplies are provided to each ink supply passage in the substrate results in extremely fine tolerances with the consequential expense, which that entails.

By quote "page width" is meant that the printhead prints one line at a time on the print media without traversing the print media, or rastering, as the print media moves past the printhead.

SUMMARY OF THE INVENTION

According to one aspect of the invention there is provided a print engine comprising:

a plurality of ink reservoirs;

a plurality of first passages each in fluid flow communication with a respective reservoir;

a plurality of second passages, each corresponding to a respective first passage, the second passages being spaced from the first passages;

a plurality of third passages, each connecting, in fluid flow communication, a respective first passage and the corresponding second passage; and a plurality of microelectromechanical (MEMS) ink ejection devices connected in fluid flow communication with each second passage.

According to a further aspect of the invention there is provided an elongate printhead structure comprising:

a plurality of first parallel ink passages extending longitudinally relative to the printhead;

a plurality of second parallel ink passages, spaced from the first passages and extending longitudinally relative to the printhead, each second passage corresponding to a respective one of said first passages;

a plurality of third passages each opening into a respective second passage, and connecting that passage in fluid flow communication with the corresponding first passage, wherein each third passage extends substantially transversely relative to the printhead;

a plurality of fourth passages opening into each second passage, each fourth passage extending substantially transversely relative to the printhead; and a plurality of individual microelectromechanical (MEMS) ink ejection devices, each device being connected with a respective fourth passage.

Preferably, each second passage is of smaller width than the respective corresponding first passage.

Preferably, the structure further comprises an ink distributor moulding defining a plurality of channels, each channel corresponding with, and opening into, a respective first passage. Each channel is preferably connected with an end of the respective first passage and is preferably connected in fluid flow communication with an ink supply reservoir.

The structure preferably further comprises a first silicon wafer which defines at least part of each second passage and each third passage. The structure also preferably further comprises a second silicon wafer which is superposed on the first wafer and which defines said fourth passages. Preferably, the second silicon wafer defines part of each second passage. Each second passage preferably extends along, and opens through, a face of the first wafer, the second wafer being joined to said face.

Preferably, the structure further comprises a pair of elongate printhead components, one of said components defining a plurality of longitudinal recesses and the other of said components covering said recesses so that the recesses constitute said first passages. Said one component preferably defines at least a part of each third passage.

BRIEF DESCRIPTION OF THE DRAWINGS

The invention will now be described by way of example with reference to the accompanying diagrammatic drawings in which.

DETAILED DESCRIPTION OF THE DRAWINGS

Figure 1:
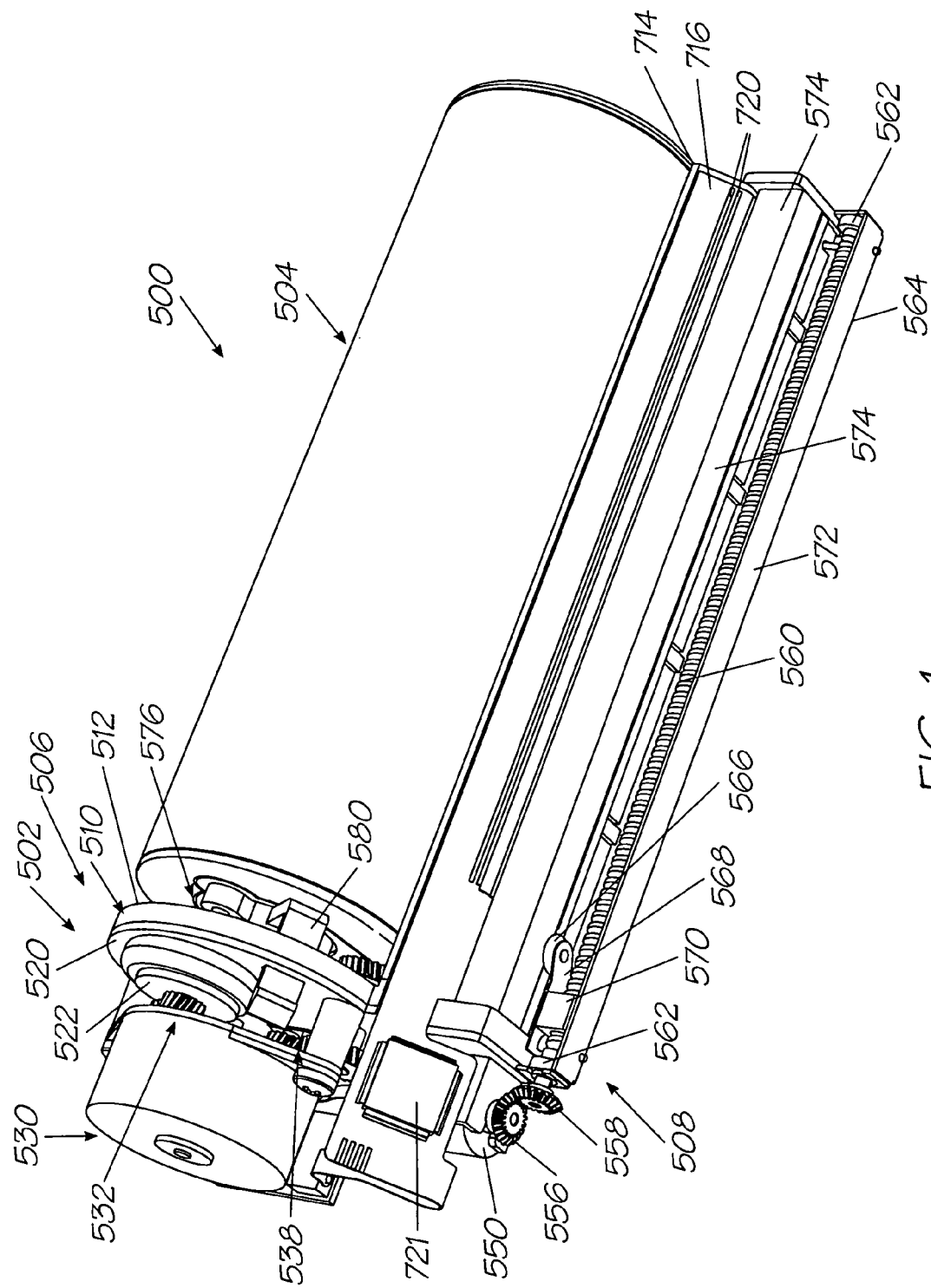
FIG. 1 shows a three dimensional view of a print engine, including components in accordance with the invention.

In the drawings, reference numeral 500 generally designates a print engine, in accordance with the invention. The print engine 500 includes a print engine assembly 502 on which a print roll cartridge 504 is removably mountable.

The print cartridge 504 is described in greater detail in our co-pending applications entitled "A Print Cartridge" and "An Ink Cartridge" filed simultaneously herewith as U.S. Ser. Nos. 09/607,993 and 09/607,251 respectively, the contents of that disclosure being specifically incorporated herein by reference.

The print engine assembly 502 comprises a first sub-assembly 506 and a second, printhead sub-assembly 508.

Figure 5:
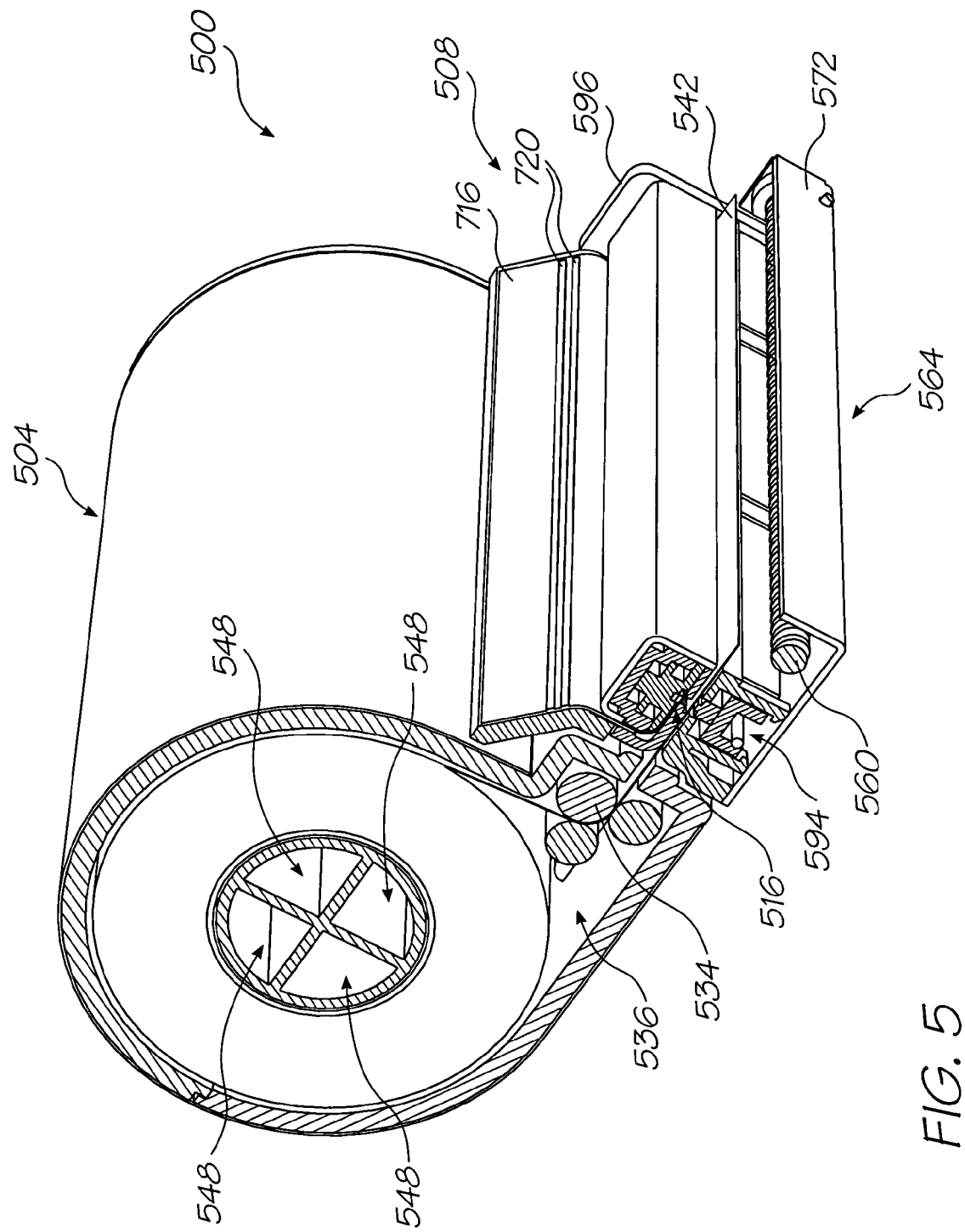
FIG. 5 shows a three dimensional, sectional view of the print engine.
Figure 6:
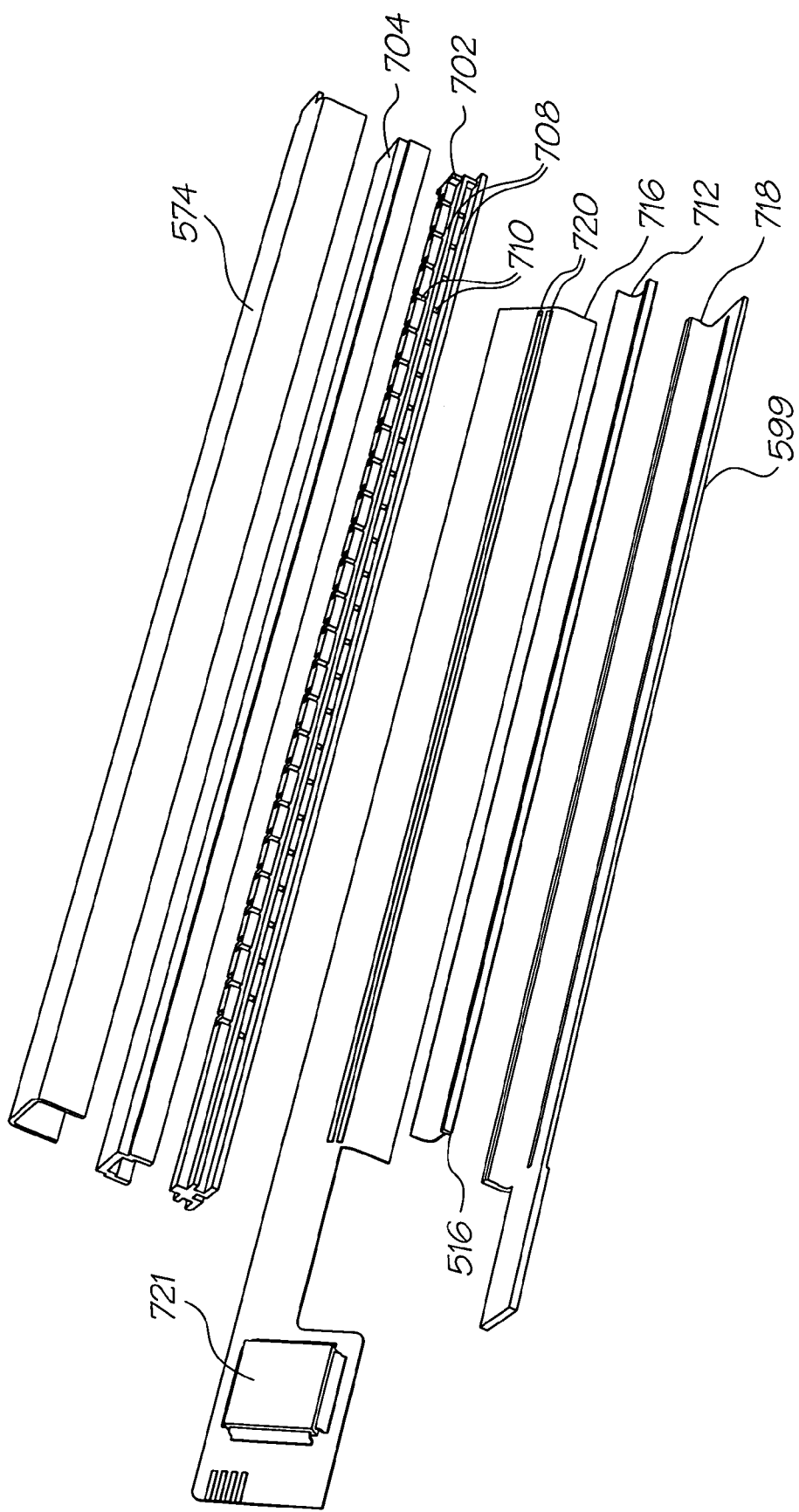
FIG. 6 shows a three dimensional, exploded view of a printhead sub-assembly of the print engine.

The sub-assembly 506 includes a chassis 510. The chassis 510 comprises a first molding 512 in which ink supply channels 514 are molded. The ink supply channels 514 supply inks from the print cartridge 504 to a printhead 516 (FIGS. 5 to 7) of the printhead sub-assembly 508. The printhead 516 prints in four colors or three colors plus ink which is visible in the infrared light spectrum only (hereinafter referred to as 'infrared ink'). Accordingly, four ink supply channels 514 are defined in the molding 512 together with an air supply channel 518. The air supply channel 518 supplies air to the printhead 516 to inhibit the build up of foreign particles on a nozzle guard of the printhead 516.

The chassis 510 further includes a cover molding 520. The cover molding 520 supports a pump 522 thereon. The pump 522 is a suction pump, which draws air through an air filter in the print cartridge 504 via an air inlet pin 524 and an air inlet opening 526. Air is expelled through an outlet opening 528 into the air supply channel 518 of the chassis 510.

Figure 2:
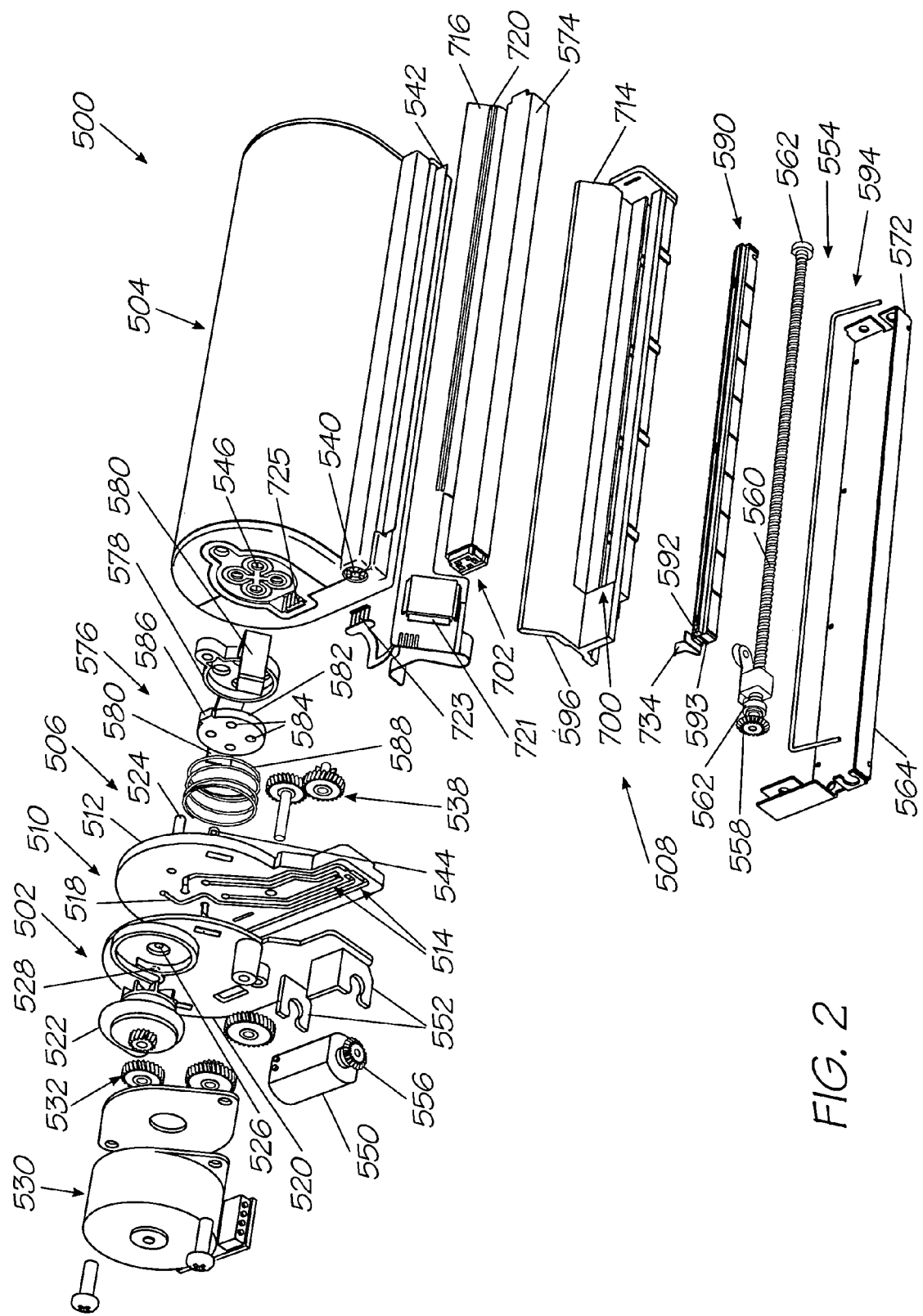
FIG. 2 shows a three dimensional, exploded view of the print engine.

The chassis 510 further supports a first drive motor in the form of a stepper motor 530. The stepper motor 530 drives the pump 522 via a first gear train 532. The stepper motor 530 is also connected to a drive roller 534 (FIG. 5) of a roller assembly 536 of the print cartridge 504 via a second gear train 538. The gear train 538 engages an engagable element 540 (FIG. 2) carried at an end of the drive roller 534. The stepper motor 530 thus controls the feed of print media 542 to the printhead 516 of the sub-assembly 508 to enable an image to be printed on the print media 542 as it passes beneath the printhead 516. It also to be noted that, as the stepper motor 530 is only operated to advance the print media 542, the pump 522 is only operational to blow air over the printhead 516 when printing takes place on the print media 542.

The molding 512 of the chassis 510 also supports a plurality of ink supply conduits in the form of pins 544 which are in communication with the ink supply channels 514. The ink supply pins 544 are received through an elastomeric collar assembly 546 of the print cartridge 504 for drawing ink from ink chambers or reservoirs 548 (FIG. 5) in the print cartridge 504 to be supplied to the printhead 516.

A second motor 550, which is a DC motor, is supported on the cover molding 520 of the chassis 510 via clips 552. The motor 550 is provided to drive a separating means in the form of a cutter arm assembly 554 to part a piece of the print media 542, after an image has been printed thereon, from a remainder of the print media. The motor 550 carries a beveled gear 556 on an output shaft thereof. The beveled gear 556 meshes with a beveled gear 558 carried on a worm gear 560 of the cutter assembly 554. The worm gear 560 is rotatably supported via bearings 562 in a chassis base plate 564 of the printhead sub-assembly 508.

The cutter assembly 554 includes a cutter wheel 566, which is supported on a resiliently flexible arm 568 on a mounting block 570. The worm gear 560 passes through the mounting block 570 such that, when the worm gear 560 is rotated, the mounting block 570 and the cutter wheel 566 traverse the chassis base plate 564. The mounting block 570 bears against a lip 572 of the base plate 564 to inhibit rotation of the mounting block 570 relative to the worm gear 560. Further, to effect cutting of the print media 542, the cutter wheel 566 bears against an upper housing or cap portion 574 of the printhead sub-assembly 508. This cap portion 574 is a metal portion. Hence, as the cutter wheel 566 traverses the capped portion 574, a scissors-like cutting action is imparted to the print media to separate that part of the print media 542 on which the image has been printed.

The sub-assembly 506 includes an ejector mechanism 576. The ejector mechanism 576 is carried on the chassis 510 and has a collar 578 having clips 580, which clip and affix the ejector mechanism 576 to the chassis 510. The collar 578 supports an insert 582 of an elastomeric material therein. The elastomeric insert 582 defines a plurality of openings 584. The openings 584 close off inlet openings of the pins 544 to inhibit the ingress of foreign particles into the pins 544 and, in so doing, into the channels 514 and the printhead 516. In addition, the insert 584 defines a land or platform 586 which closes off an inlet opening of the air inlet pin 524 for the same purposes.

Figure 3:
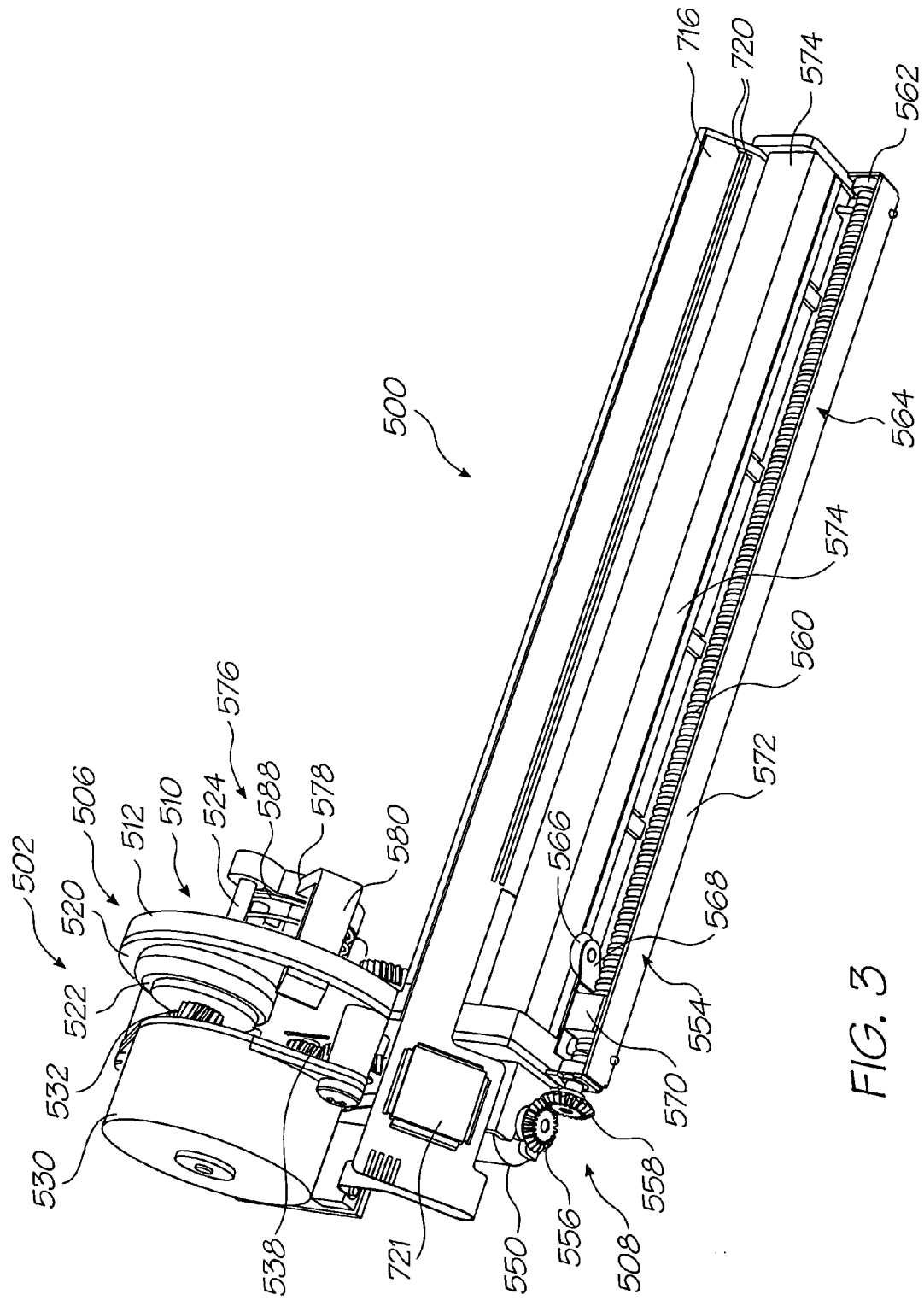
FIG. 3 shows a three dimensional view of the print engine with a removable print cartridge used with the print engine removed.
Figure 4:
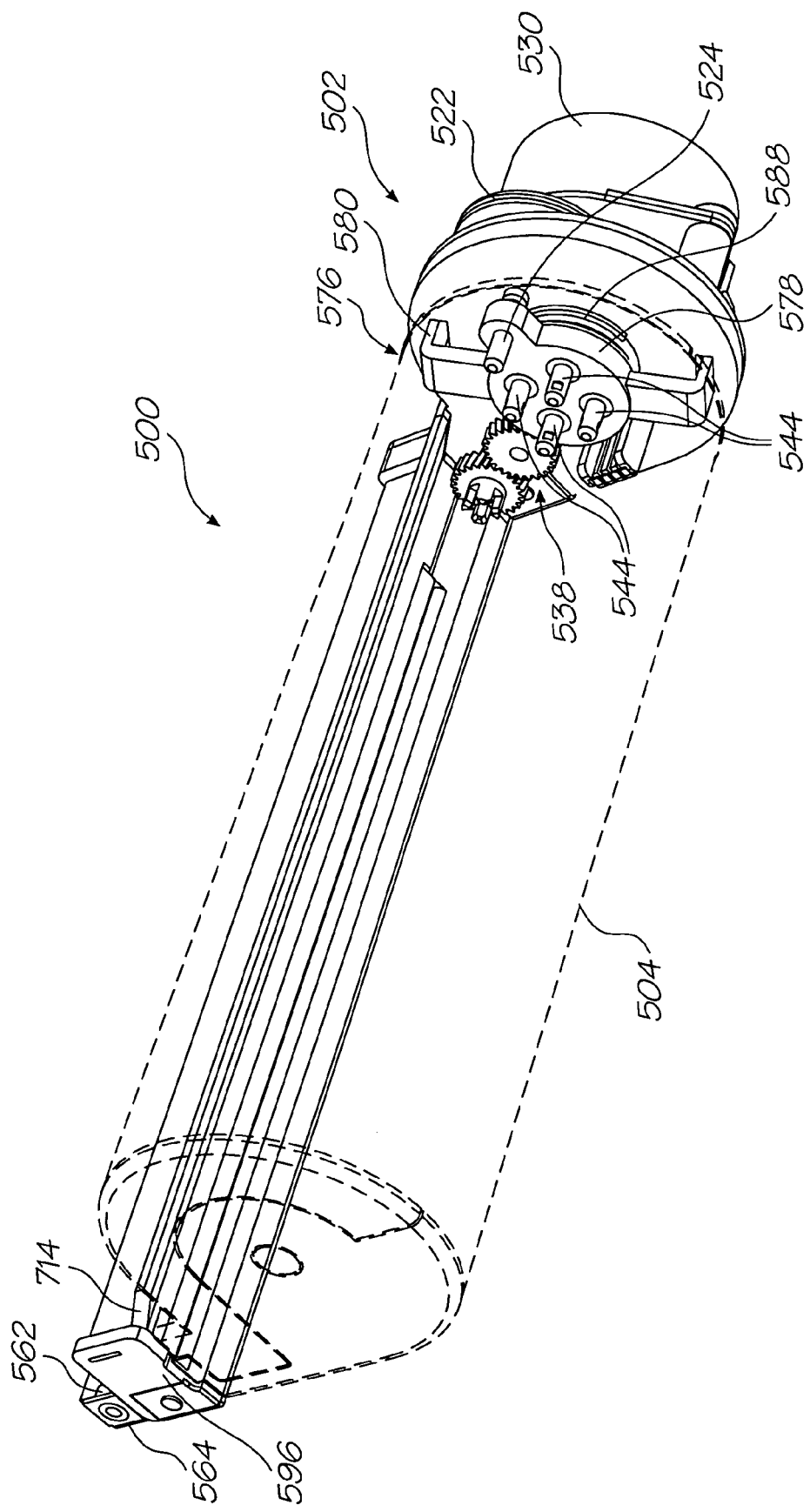
FIG. 4 shows a three dimensional, rear view of the print engine with the print cartridge shown in dotted lines.

A coil spring 588 is arranged between the chassis 510 and the collar 578 to urge the collar 578 to a spaced position relative to the chassis 510 when the cartridge 504 is removed from the print engine 500, as shown in greater detail in FIG. 3 of the drawings. The ejector mechanism 576 is shown in its retracted position in FIG. 4 of the drawings.

The printhead sub-assembly 508 includes, as described above, the base plate 564. A capping mechanism 590 is supported displaceably on the base plate 564 to be displaceable towards and away from the printhead 516. The capping mechanism 590 includes an elongate rib 592 arranged on a carrier 593. The carrier is supported by a displacement mechanism 594, which displaces the rib 592 into abutment with the printhead 516 when the printhead 516 is inoperative. Conversely, when the printhead 516 is operational, the displacement mechanism 594 is operable to retract the rib 592 out of abutment with the printhead 516.

The printhead sub-assembly 508 includes a printhead support molding 596 on which the printhead 516 is mounted. The molding 596, together with an insert 599 arranged in the molding 596, define a passage 598 through which the print media 542 passes when an image is to be printed thereon. A groove 700 is defined in the molding 596 through which the capping mechanism 590 projects when the capping mechanism 590 is in its capping position.

An ink feed arrangement 702 is supported by the insert 599 beneath the cap portion 574. The ink feed arrangement 702 comprises a spine portion 704 and a casing 706 mounted on the spine portion 704. The spine portion 704 and the casing 706, between them, define ink feed galleries 708 which are in communication with the ink supply channels 514 in the chassis 510 for feeding ink via passages 710 (FIG. 7) to the printhead 516.

Figure 8:
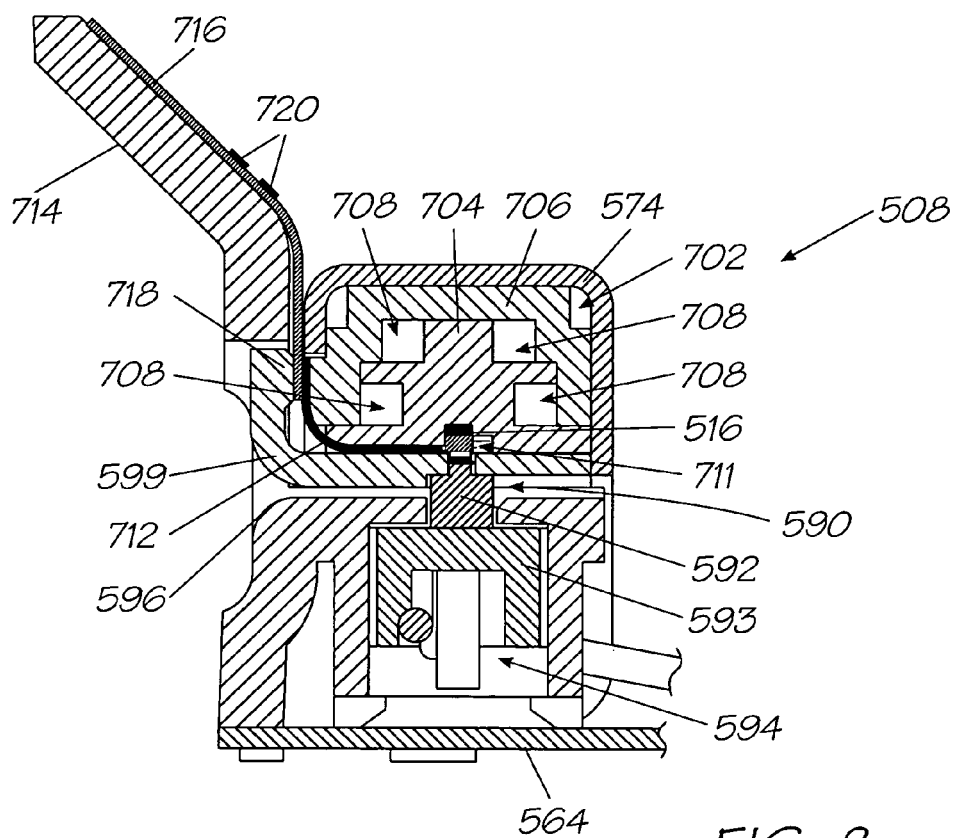
FIG. 8 shows a sectional end view of the printhead sub-assembly with a capping mechanism in a capping position.
Figure 9:
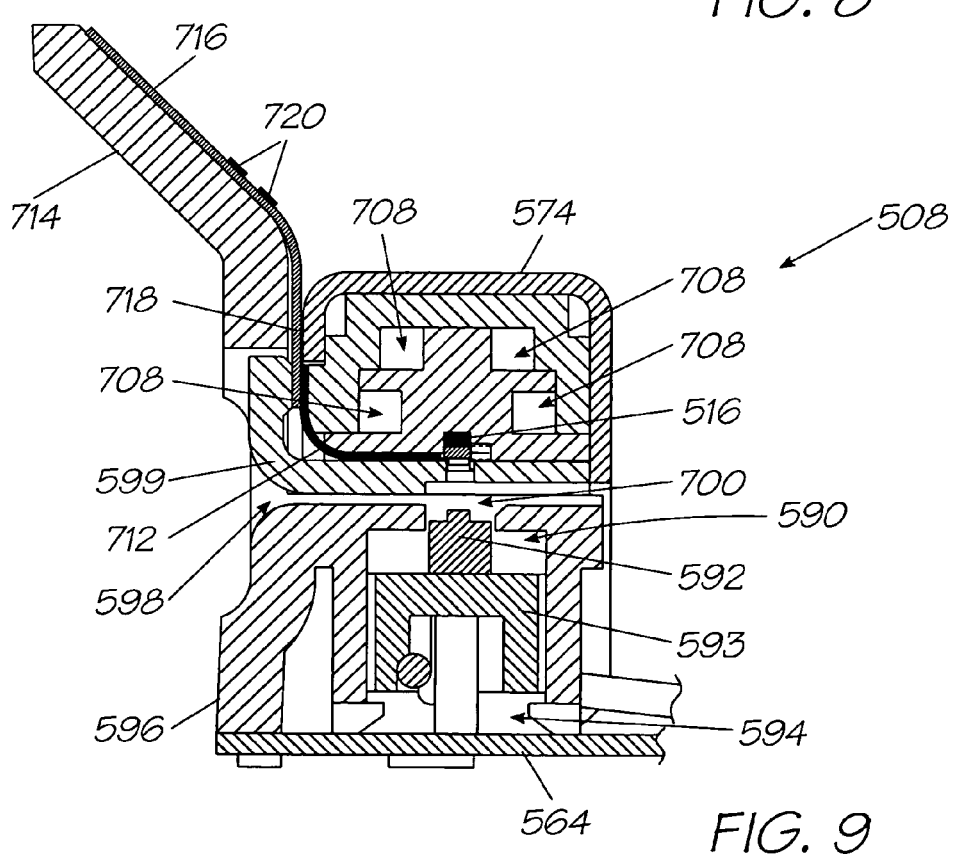
FIG. 9 shows the printhead sub-assembly with the capping mechanism in its uncapped position.
Figure 10:
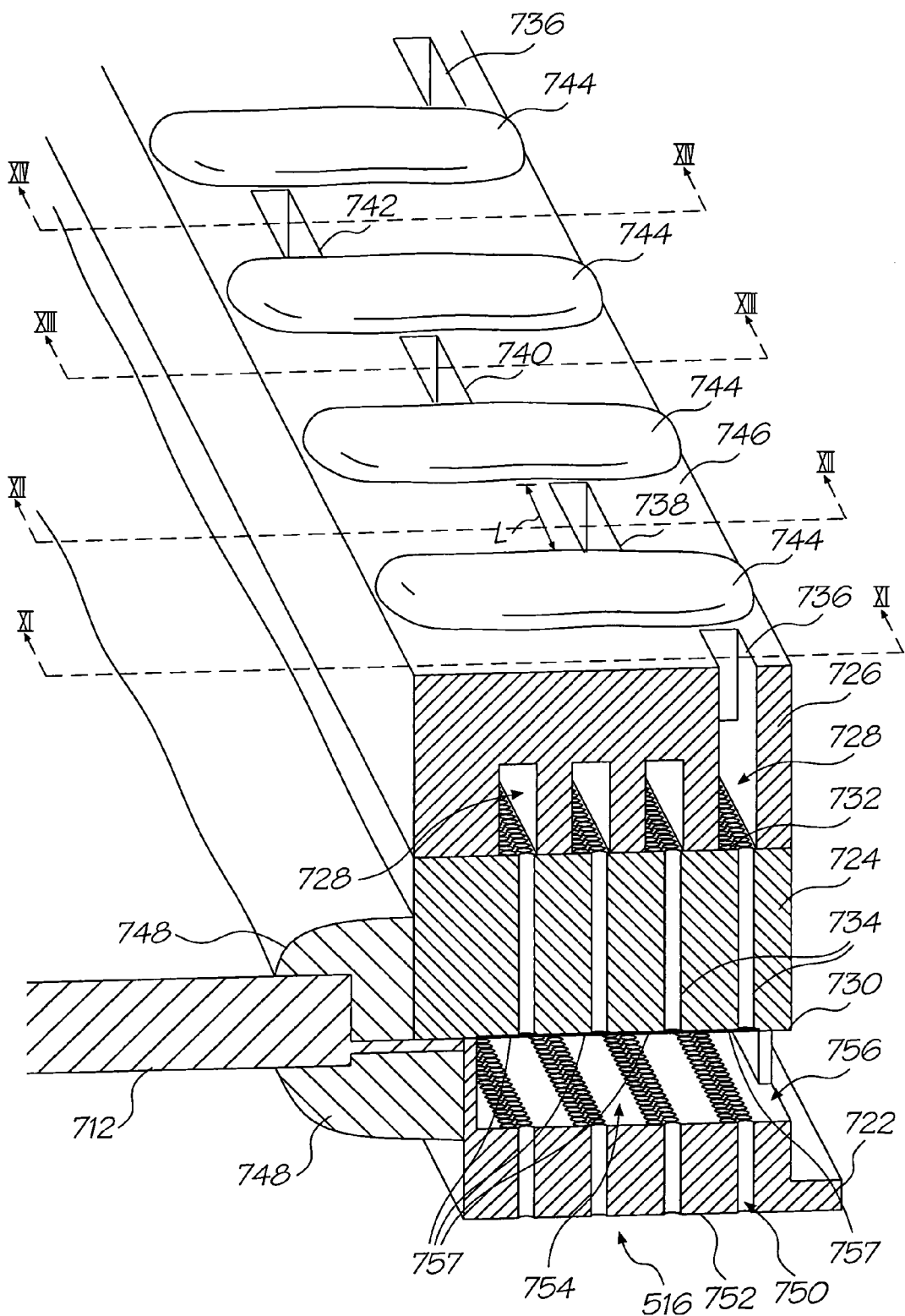
FIG. 10 shows a schematic, three dimensional view of part of an ink supply arrangement, in accordance with the invention, for a printhead of a print engine.
Figure 11:
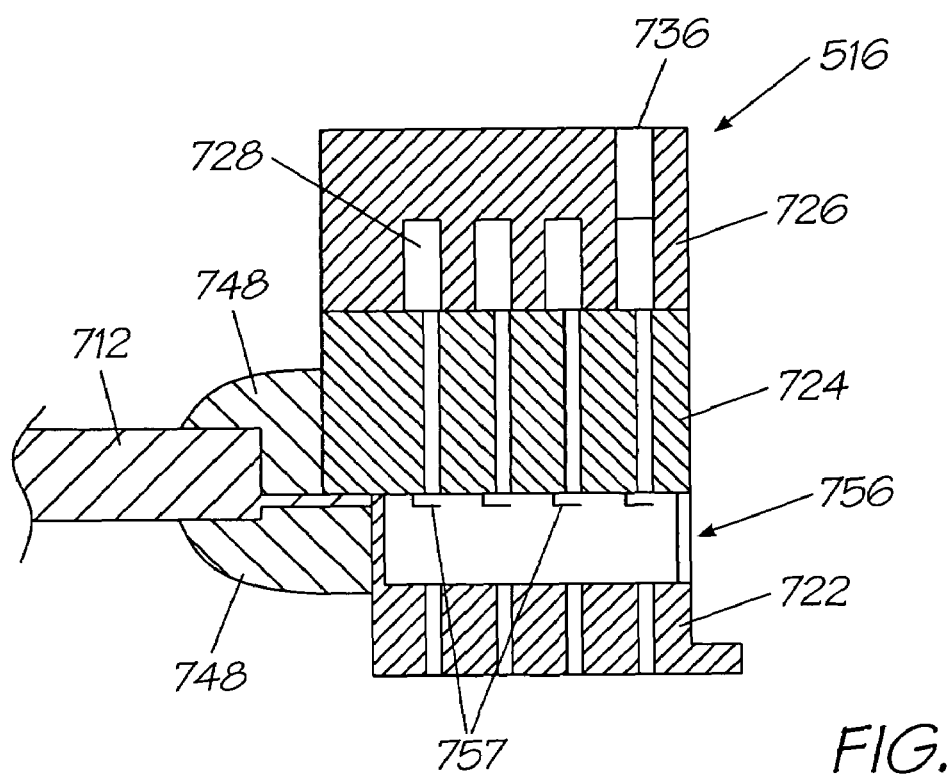
FIG. 11 shows a schematic, sectional end view of the ink supply arrangement taking along line XI-XI in FIG. 10.
Figure 12:
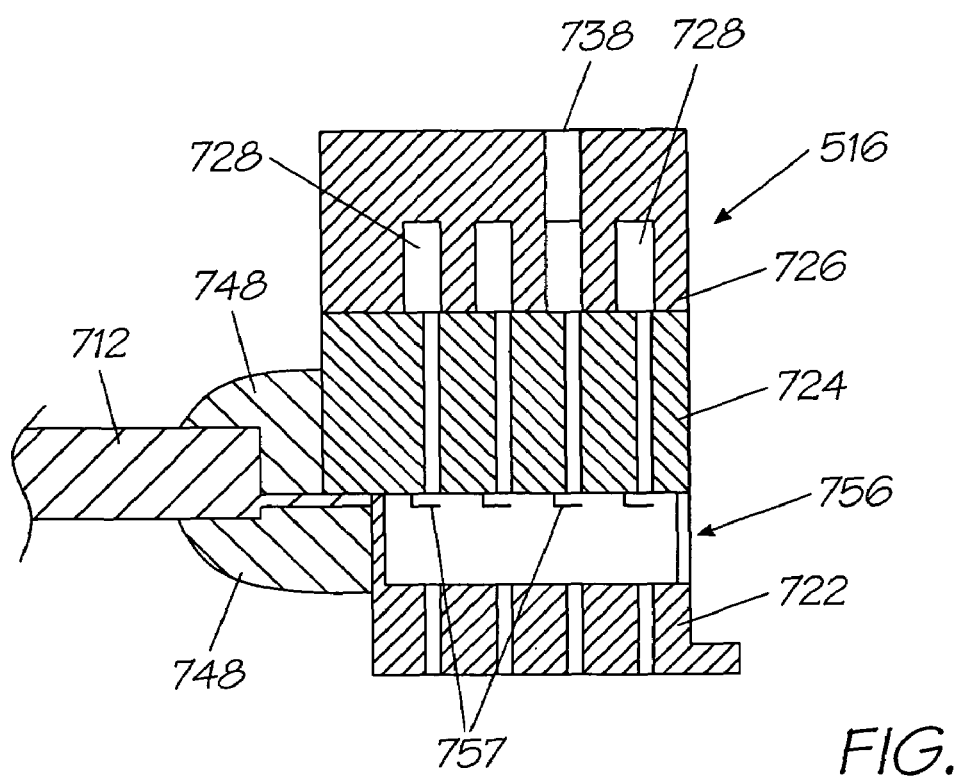
FIG. 12 shows a schematic, sectional end view of the ink supply arrangement taken along line XII-XII in FIG. 10.
Figure 13:
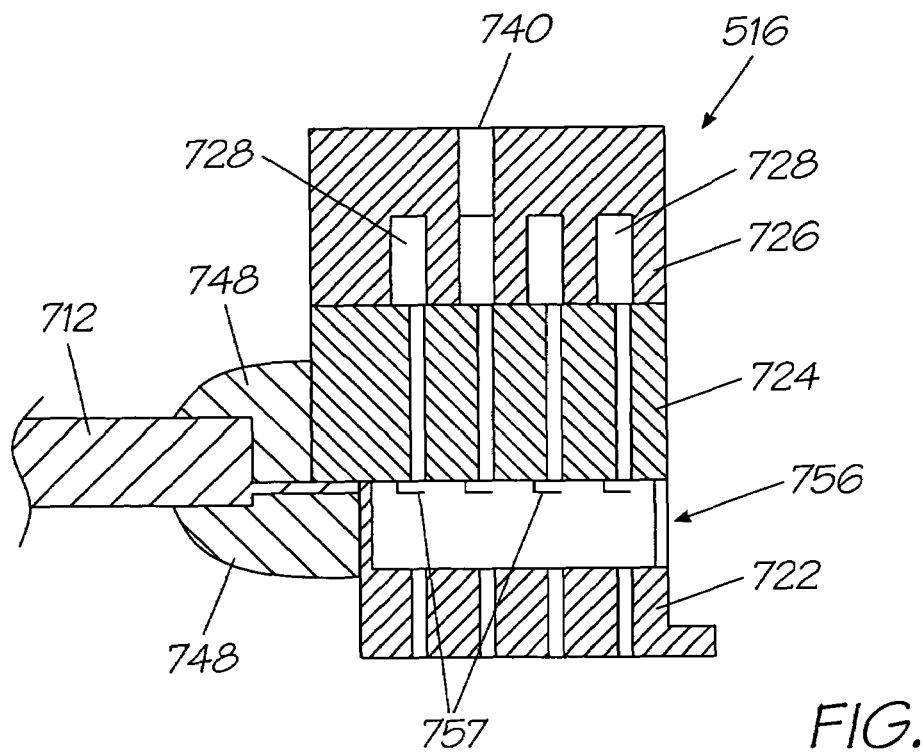
FIG. 13 shows a schematic, sectional end view of the ink supply arrangement taken along line XIII-XIII in FIG. 10.
Figure 14:
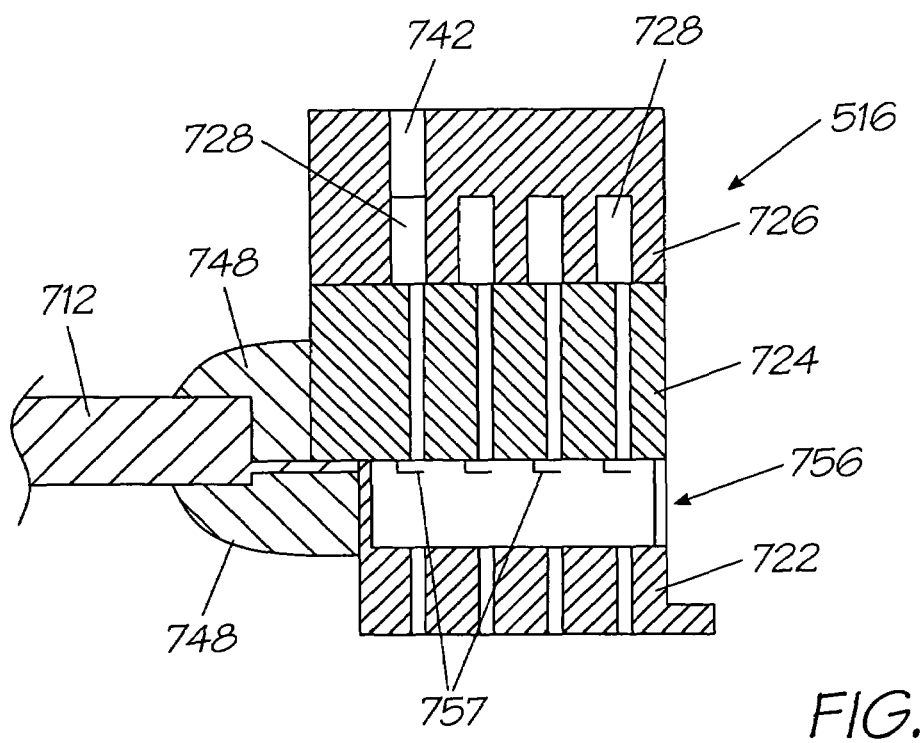
FIG. 14 shows a schematic, sectional end view of the ink supply arrangement taken along line XIV-XIV in FIG. 10.

An air supply channel 711 (FIG. 8) is defined in the spine portion 704, alongside the printhead 516.

Electrical signals are provided to the printhead 516 via a TAB film 712 which is held captive between the insert 599 and the ink feed arrangement 702.

The molding 596 includes an angled wing portion 714. A flexible printed circuit board (PCB) 716 is supported on and secured to the wing portion 714. The flex PCB 716 makes electrical contact with the TAB film 712 by being urged into engagement with the TAB film 712 via a rib 718 of the insert 599. The flex PCB 716 supports busbars 720 thereon. The busbars 720 provide power to the printhead 516 and to the other powered components of the print engine 500. Further, a camera print engine control chip 721 is supported on the flex PCB 716 together with a QA chip (not shown) which authenticates that the cartridge 504 is compatible and compliant with the print engine 500. For this purpose, the PCB 716 includes contacts 723 which engage contacts 725 in the print cartridge 504.

Figure 7:
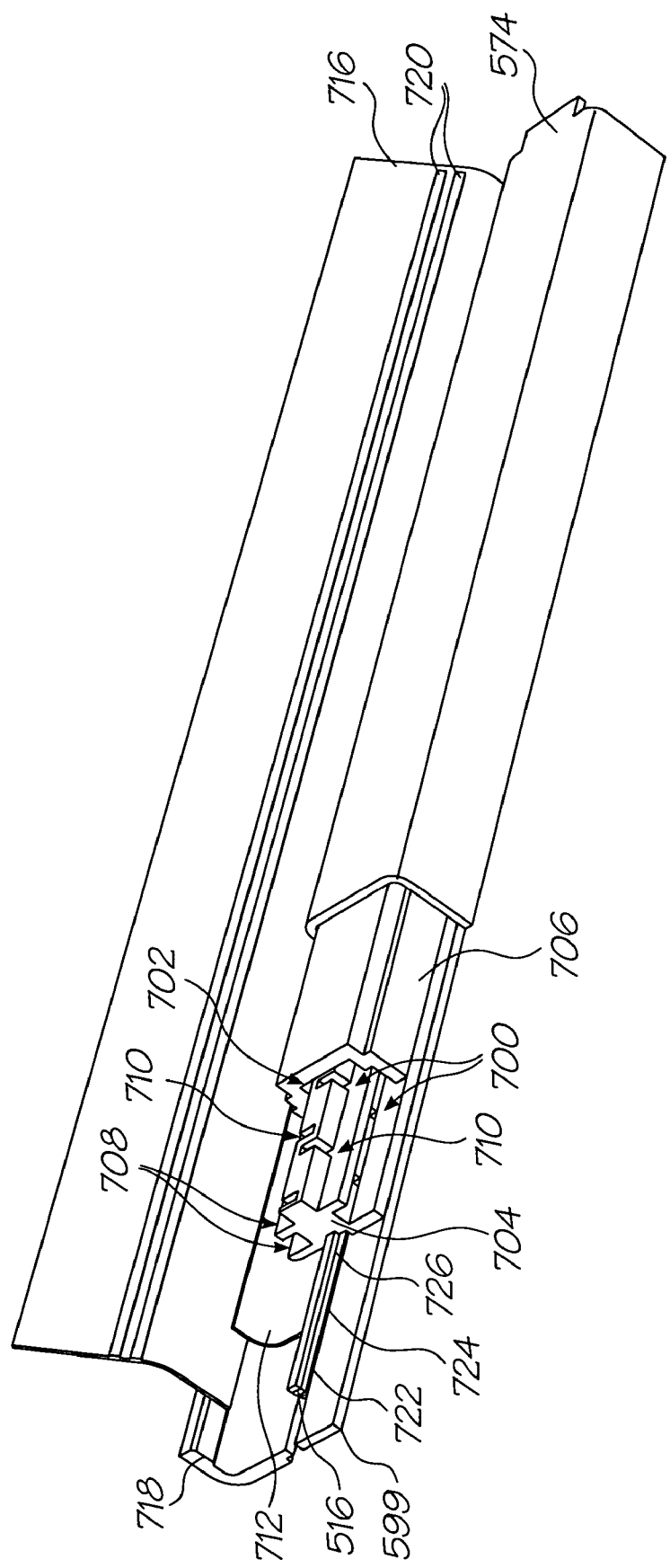
FIG. 7 shows a partly cutaway view of the printhead sub-assembly.

As illustrated more clearly in FIG. 7 of the drawings, the printhead itself includes a nozzle guard 722 arranged on a silicon wafer 724. The ink is supplied to a nozzle array (not shown) of the printhead 516 via an ink supply member 726. The ink supply member 726 communicates with outlets of the passages 710 of the ink feed arrangement 702 for feeding ink to the array of nozzles of the printhead 516, on demand.

The arrangement of the printhead is shown in greater detail in FIGS. 10 to 14 of the drawings. The ink supply member 726 is a block of silicon wafer which is mounted on the silicon wafer 724. The member 726 has channels 728 formed therein. The channels 728 extend the length of the member 726.

As described above, the printhead 516 is a multi-color printhead having nozzles 757 arranged in groups. Each group prints one color or the infrared ink. The nozzles 757 are MEMS devices mounted on a surface 730 of the silicon wafer 724 with the member 726 being mounted on an opposed surface 732 of the silicon wafer 724. Hence, as shown more clearly in FIG. 10 of the drawings, each group of nozzles 757 is supplied by an ink supply passage 734.

Thus, each channel 728 of the member 726 communicates with its associated group of passages 734. Each channel 728 has a plurality of ink inlet openings 736, 738, 740 and 742. For example, the ink inlet openings 736 supply black ink to the first group of ink supply passages 734 of the wafer 724. Instead, where three colors and infrared ink are provided, the ink inlet openings 736 provide infrared ink to the first group of passages. The inlet openings 738 provide magenta ink to the second group of nozzles via their inlet passages 734. The ink inlet openings 740 provide yellow ink to the third group of nozzles via their passages 734. The final group of inlet openings 742 provide cyan ink to the fourth group of nozzles via their passages 734.

Each inlet opening 736, 738, 740, 742 is isolated from its neighboring opening via a transversely extending bead of sealing material 744. It will be appreciated that the ink feed arrangement 702 bears against the top surface 746 of the member 726 further to isolate the openings 736 to 742 from one another.

Also, it is to be noted that the TAB film 712 is bonded to the surface 730 of the wafer 724 via beads of adhesive 748. The beads 748 further form a fluid tight seal against the side of the wafer 724.

Ink ejected from each MEMS device 757 is ejected through a passage 750 in the nozzle guard 722. To maintain a surface 752 of the nozzle guard and a region 754 between the nozzle guard 722 and the wafer 724 free of foreign particles, air is blown on to the surface 752 of the nozzle guard 722 and, via inlet openings 756 from the channel 710 into the region 754.

The member 726 is a silicon wafer and, accordingly, the channels 728 and the inlet openings 736 to 742 are formed in the wafer by etching techniques.

As described in the introduction to the specification, the spacing between the passages 734 and the wafer 724 is of the order of one hundred micrometers. In contrast, each ink inlet opening 736 to 742 has a length dimension L of approximately 0.5 millimeters. The spacing between adjacent inlet openings is also of the order of 0.5 millimeters. If one considers the width dimension of the printhead 516 as the X dimension with a length of the printhead as a Y dimension the ink supply member 726 effectively functions as an adapter converting a small X dimension into a much larger Y dimension. Accordingly, it is easier to fabricate the feed passages of the ink feed arrangement 702, which is a plastic molding, than would be the case if the ink feed arrangement fed the ink directly into the wafer 724 of the printhead 516.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A printhead for inkjet printing, the printhead comprising:
    a substrate;
    a plurality of nozzles arranged on the substrate in groups, the substrate defining groups of ink supply passages to supply an ink of a particular color to respective nozzles of each group;
    a nozzle guard arranged with respect to the nozzles to define a space between the nozzle guard and the nozzles, the nozzle guard defining a plurality of passages with each passage being in register with a respective nozzle so that each nozzle can eject the ink across the space and through a respective passage; and
    an ink supply member mounted on the substrate and which defines channels in fluid communication with respective groups of ink supply passages, the ink supply member having a plurality of ink inlet openings in fluid communication with respective channels, the ink inlet openings being separated by transversely extending beads of sealing material to isolate the ink inlet openings from each other when the printhead is mounted.

2. A printhead as claimed in claim 1, wherein the substrate comprises a silicon wafer in which the plurality of ink supply passages is defined.

3. A printhead as claimed in claim 1, in which the groups comprise rows of nozzles and corresponding passages in the nozzle guard.

4. A printhead as claimed in claim 1, wherein an air supply is arranged to supply air into the space between the nozzle guard and the nozzles.

* * * * *